US011398629B2

(12) United States Patent
Imashiro et al.

(10) Patent No.: US 11,398,629 B2
(45) Date of Patent: *Jul. 26, 2022

(54) CARBON CATALYST, ELECTRODE, AND BATTERY

(71) Applicants: NISSHINBO HOLDINGS INC., Tokyo (JP); NATIONAL UNIVERSITY CORPORATION GUNMA UNIVERSITY, Maebashi (JP)

(72) Inventors: Yasuo Imashiro, Chiba (JP); Takeaki Kishimoto, Chiba (JP); Tetsutaro Sato, Chiba (JP); Jun-ichi Ozaki, Kiryu (JP); Takuya Maie, Chiba (JP); Sayaka Kusadokoro, Kiryu (JP)

(73) Assignees: NISSHINBO HOLDINGS INC., Tokyo (JP); NATIONAL UNIVERSITY CORPORATION GUNMA UNIVERSITY, Maebashi (JP)

( * ) Notice: Subject to any disclaimer, the term of this patent is extended or adjusted under 35 U.S.C. 154(b) by 263 days.

This patent is subject to a terminal disclaimer.

(21) Appl. No.: 16/581,848

(22) Filed: Sep. 25, 2019

(65) Prior Publication Data
US 2020/0036013 A1    Jan. 30, 2020

Related U.S. Application Data

(63) Continuation of application No. 15/301,775, filed as application No. PCT/JP2015/083614 on Nov. 30, 2015, now Pat. No. 10,468,688.

(30) Foreign Application Priority Data

Dec. 5, 2014   (JP) ................. 2014-246820

(51) Int. Cl.

| C01B 31/08 | (2006.01) |
| H01M 4/90 | (2006.01) |
| H01M 12/06 | (2006.01) |
| H01M 8/10 | (2016.01) |
| B01J 21/18 | (2006.01) |
| H01M 12/08 | (2006.01) |
| B01J 37/08 | (2006.01) |
| H01M 4/587 | (2010.01) |
| H01M 4/583 | (2010.01) |
| H01M 4/133 | (2010.01) |
| C01B 32/05 | (2017.01) |
| C01B 32/306 | (2017.01) |
| H01M 8/1004 | (2016.01) |
| H01M 8/1018 | (2016.01) |

(52) U.S. Cl.
CPC .............. *H01M 4/90* (2013.01); *B01J 21/18* (2013.01); *B01J 37/08* (2013.01); *C01B 32/05* (2017.08); *C01B 32/306* (2017.08); *H01M 4/133* (2013.01); *H01M 4/583* (2013.01); *H01M 4/587* (2013.01); *H01M 8/10* (2013.01); *H01M 8/1004* (2013.01); *H01M 8/1018* (2013.01); *H01M 12/06* (2013.01); *H01M 12/08* (2013.01); *H01M 2008/1095* (2013.01); *H01M 2300/0082* (2013.01)

(58) Field of Classification Search
CPC .................................................. C01B 32/306
See application file for complete search history.

(56) References Cited

U.S. PATENT DOCUMENTS

| 5,591,545 | A |  | 1/1997 | Miyashita et al. |
| 6,294,501 | B1 | * | 9/2001 | Chang ................ B01J 20/3483 502/418 |
| 8,372,781 | B2 | * | 2/2013 | Horiguchi ............ B01J 23/745 502/417 |
| 8,993,164 | B2 |  | 3/2015 | Matsuzaka et al. |
| 9,540,724 | B2 |  | 1/2017 | Ogino |
| 10,468,688 | B2 | * | 11/2019 | Imashiro .............. H01M 4/133 |
| 2003/0175580 | A1 |  | 9/2003 | Ozaki et al. |

(Continued)

FOREIGN PATENT DOCUMENTS

| CN | 102639236 A | 8/2012 |
| CN | 102770371 A | 11/2012 |

(Continued)

OTHER PUBLICATIONS

Jan. 12, 2016 International Search Report issued in International Patent Application No. PCT/JP2015/083614.
Jan. 12, 2016 Written Opinion issued in International Patent Application No. PCT/JP2015/083614.
Aug. 22, 2017 extended European Search Report issued in Application No. 15865049.9.
Fanny Charreteur et al., "Increasing the activity of Fe/N/C catalysts in PEM fuel cell cathodes using carbon blacks with a high-disordered carbon content," Electrochimica Acta 53 (2008) 6881-6889.
Hangjja Shen et al., "Atomically FeN2 moieties dispersed on mesoporous carbon: A new atomic catalyst for efficient oxygen reduction catalysis," Nano Energy 35 (2017), 9-16.
Explanation about Peak Separation, 25 pages.

(Continued)

*Primary Examiner* — Stuart L Hendrickson
(74) *Attorney, Agent, or Firm* — Oliff PLC

(57) ABSTRACT

Provided are a carbon catalyst, an electrode, and a battery that exhibit excellent activity. A carbon catalyst according to one embodiment of the present invention has a carbon structure in which area ratios of three peaks $f_{broad}$, $f_{middle}$, and $f_{narrow}$ obtained by separating a peak in the vicinity of a diffraction angle of 26° in an X-ray diffraction pattern obtained by powder X-ray diffraction satisfy the following conditions (a) to (c): (a) $f_{broad}$: 75% or more and 96% or less; (b) $f_{middle}$: 3.2% or more and 15% or less; and (c) $f_{narrow}$: 0.4% or more and 15% or less.

8 Claims, 4 Drawing Sheets

(56) References Cited

U.S. PATENT DOCUMENTS

| | | |
|---|---|---|
| 2008/0076008 A1 | 3/2008 | Ozaki et al. |
| 2012/0220446 A1 | 8/2012 | Kishimoto et al. |
| 2012/0231338 A1 | 9/2012 | Matsuzaka et al. |
| 2012/0313053 A1 | 12/2012 | Fujii et al. |
| 2014/0011672 A1 | 1/2014 | Kishimoto et al. |
| 2015/0352522 A1 | 12/2015 | Mizuuchi et al. |

FOREIGN PATENT DOCUMENTS

| | | |
|---|---|---|
| JP | 2003-249231 A | 9/2003 |
| JP | 2007-207662 A | 8/2007 |
| JP | 2011-115760 A | 6/2011 |
| JP | 2014-201463 A | 10/2014 |
| WO | 2011/055739 A1 | 5/2011 |
| WO | 2011/070975 A1 | 6/2011 |
| WO | 2014129597 A1 | 8/2014 |

OTHER PUBLICATIONS

Sep. 7, 2018 Office Action issued in U.S. Appl. No. 15/301,775.
Mar. 25, 2019 Office Action issued in U.S. Appl. No. 15/301,775.
Jul. 24, 2017 Office Action issued in U.S. Appl. No. 15/301,775.
Dec. 8, 2017 Office Action issued in U.S. Appl. No. 15/301,775.

* cited by examiner

FIG. 1

| SAMPLE | OXYGEN REDUCTION ACTIVITY | | XRD AREA RATIO (%) | | | TPD | | PEAK TOP POSITION IN CO₂ DESORPTION (°C) | OXYGEN ADSORPTION HEAT (kJ/mol) |
|---|---|---|---|---|---|---|---|---|---|
| | $E_{O2}$ (V vs. NHE) | $i_{0.7}$ (mA/cm²) | $f_{broad}$ | $f_{middle}$ | $f_{narrow}$ | CO DESORPTION AMOUNT (mmol/g) | CO₂ DESORPTION AMOUNT (mmol/g) | | |
| 1 | 0.816 | -0.844 | 96.49 | 3.19 | 0.32 | 0.69 | 0.15 | 350 | 13.9 |
| 2 | 0.834 | -1.881 | 93.51 | 4.70 | 1.80 | 0.60 | 0.14 | 260 | 12.3 |
| 3 | 0.842 | -2.332 | 90.97 | 5.19 | 3.84 | 0.49 | 0.12 | 270 | 9.1 |
| 4 | 0.840 | -2.097 | 80.70 | 9.68 | 9.62 | 0.48 | 0.13 | 260 | 8.8 |
| 5 | 0.829 | -1.618 | 80.62 | 11.22 | 8.16 | 0.51 | 0.15 | 300 | 10.2 |
| 6 | 0.844 | -1.300 | 82.43 | 4.30 | 4.30 | 0.69 | 0.15 | 280 | 12.0 |
| 7 | 0.829 | -2.189 | 90.47 | 4.65 | 4.88 | 0.69 | 0.15 | 280 | 11.5 |
| 8 | 0.831 | -2.150 | 88.95 | 5.42 | 5.63 | 0.68 | 0.15 | 280 | 12.6 |
| 9 | 0.841 | -2.325 | 82.53 | 13.37 | 4.10 | 0.49 | 0.12 | 270 | 9.2 |
| 10 | 0.843 | -2.395 | 85.26 | 8.45 | 6.29 | 0.48 | 0.11 | 270 | 9.0 |
| 11 | 0.822 | -1.279 | 75.00 | 12.18 | 12.82 | 0.51 | 0.12 | 270 | 12.3 |
| 12 | 0.819 | -1.921 | 78.07 | 10.69 | 11.24 | 0.50 | 0.12 | 270 | 12.3 |
| 13 | 0.820 | -1.988 | 78.37 | 11.92 | 9.71 | 0.51 | 0.12 | 270 | 12.3 |
| 14 | 0.818 | -1.613 | 78.24 | 11.92 | 9.84 | 0.50 | 0.13 | 270 | 10.7 |
| 15 | 0.817 | -1.203 | 75.02 | 14.28 | 10.70 | 0.58 | 0.13 | 270 | 9.9 |
| 16 | 0.840 | -2.254 | 78.01 | 11.89 | 10.11 | 0.54 | 0.12 | 270 | 9.2 |
| 17 | 0.822 | -1.940 | 78.61 | 11.76 | 9.63 | 0.60 | 0.13 | 270 | 11.6 |

CARBON CATALYST, ELECTRODE, AND BATTERY

This is a Continuation of application Ser. No. 15/301,775 filed Oct. 4, 2016, which is a National Stage Application of PCT/JP2015/083614 filed Nov. 30, 2015, which in turn claims priority to Japanese Application No. 2014-246820 filed Dec. 5, 2014. The entire disclosures of the prior applications are hereby incorporated by reference herein their entirety.

TECHNICAL FIELD

The present invention relates to a carbon catalyst, an electrode, and a battery.

BACKGROUND ART

Currently, as a catalyst for an electrode of a fuel cell, a platinum catalyst is used. However, there are many problems to be solved. For example, the reserves of platinum are limited. In a polymer electrolyte fuel cell (PEFC), the use of platinum increases cost. In an air cell, the use of platinum increases cost, and in addition, a chemical reaction such as decomposition of an electrolyte solution caused by platinum occurs. Therefore, an alternative technology that does not use platinum has been developed.

Specifically, for example, in Patent Literature 1, there is disclosed an electrode catalyst for a fuel cell formed of a carbonized material having a shell-like structure.

CITATION LIST

Patent Literature

[Patent Literature 1] JP 2007-207662 A

SUMMARY OF INVENTION

Technical Problem

However, the carbon structure that contributes to the catalyst activity of a carbon catalyst has not been sufficiently clarified.

The present invention has been made in view of the above-mentioned problems, and one of the objects of the present invention is to provide a carbon catalyst, an electrode, and a battery that exhibit excellent catalyst activity.

Solution to Problem

A carbon catalyst according to one embodiment of the present invention for solving the above-mentioned problems includes a carbon structure in which area ratios of three peaks $f_{broad}$, $f_{middle}$, and $f_{narrow}$ obtained by separating a peak in a vicinity of a diffraction angle of 26° in an X-ray diffraction pattern obtained by powder X-ray diffraction satisfy the following conditions (a) to (c): (a) $f_{broad}$: 75% or more and 96% or less; (b) $f_{middle}$: 3.2% or more and 15% or less; and (c) $f_{narrow}$: 0.4% or more and 15% or less. According to the present invention, the carbon catalyst that exhibits excellent catalyst activity is provided.

The carbon catalyst may include the carbon structure that exhibits an oxygen adsorption heat of 13 kJ/mol or less in oxygen adsorption and desorption measurement. The carbon catalyst may include the carbon structure in which a carbon dioxide desorption amount at from 150° C. to 900° C. exhibits a maximum value within a range of from 200° C. to 340° C. in a temperature programmed desorption method including measuring a desorption amount of carbon dioxide at from 0° C. to 1,0000° C. The carbon catalyst may include the carbon structure that exhibits a carbon monoxide desorption amount at from 150° C. to 1,000° C. of 0.30 mmol/g or more and a carbon dioxide desorption amount at from 150° C. to 900° C. of 0.10 mmol/g or more in a temperature, programmed desorption method including measuring desorption amounts of carbon monoxide and carbon dioxide at from 0° C. to 1,000° C.

An electrode according to one embodiment of the present invention for solving the above-mentioned problems includes any one of the above-mentioned carbon catalysts. According to the present invention, an electrode that exhibits excellent catalyst activity is provided.

A battery according to one embodiment of the present invention for solving the above-mentioned problems includes the above-mentioned electrode. According to the present invention, a battery including the electrode that exhibits excellent catalyst activity is provided.

Advantageous Effects of Invention

According to the present invention, the carbon catalyst, an electrode, and a battery that exhibit excellent activity are provided.

BRIEF DESCRIPTION OF DRAWINGS

FIG. 1 is an explanatory diagram showing one example of results obtained by evaluating the characteristics of a carbon catalyst in Example 1 according to one embodiment of the present invention.

DESCRIPTION OF EMBODIMENTS

Figure 2A:
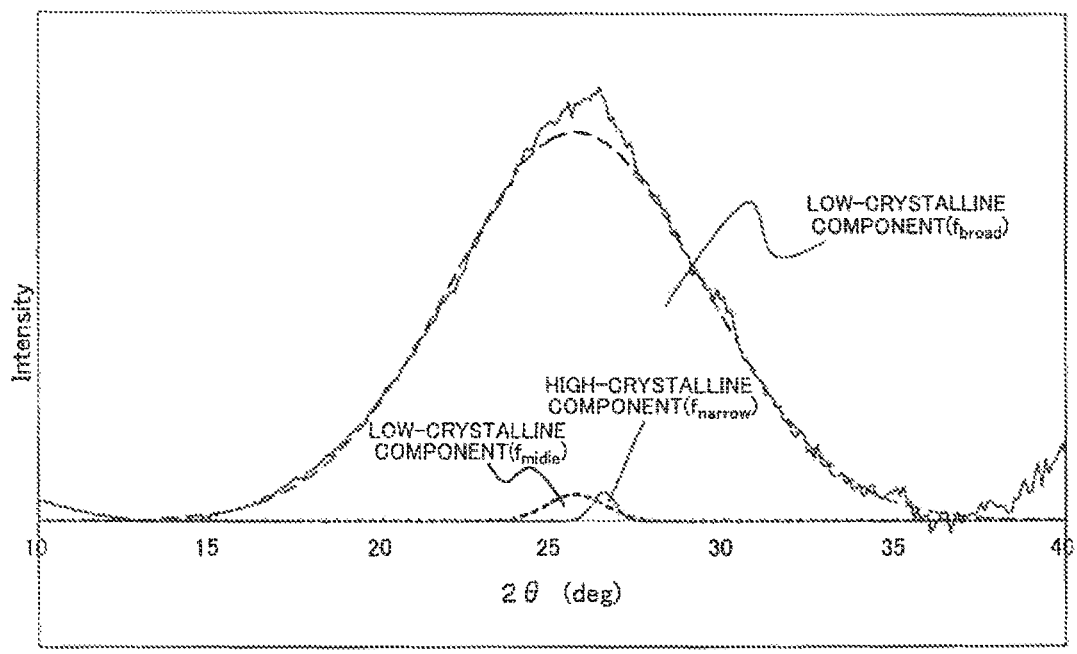
FIG. 2A is an explanatory diagram showing one example of results obtained by performing XRD peak separation in Sample 1 of Example 1 according to one embodiment of the present invention.

Hereinafter, one embodiment of the present invention will be described. The present invention is not limited to examples shown in this embodiment.

A carbon catalyst according to one embodiment of the present invention (hereinafter referred to as "catalyst of the present invention") has a carbon structure in which area ratios of three peaks $f_{broad}$, $f_{middle}$, and $f_{narrow}$ obtained by separating a peak in the vicinity of a diffraction angle of 26° in an X-ray diffraction pattern obtained by powder X-ray diffraction satisfy the following conditions (a) to (c): (a) $f_{broad}$: 75% or more and 96% or less; (b) $f_{middle}$: 3.2% or more and 15% or less; and (c) $f_{narrow}$: 0.4% or more and 15% or less.

Here, the peak separation will be described in detail. The peak separation is performed by separating a peak in the vicinity of a diffraction angle 2θ of 26° (for example, within a range of the diffraction angle of from 24° to 27° or within a range of the diffraction angle of from 23° to 27°) (peak having a peak top in the vicinity of the diffraction angle 2θ of 26°) into the following three components: $f_{broad}$, $f_{middle}$, and $f_{narrow}$. More specifically, the peak separation is performed by the following procedure. First, an X-ray diffraction pattern obtained by powder X-ray diffraction measurement is subjected to intensity correction of a polarization factor, a Lorentz factor, and an atom scattering factor of carbon, and is also subjected to background correction in which a straight line connecting the vicinity of the diffraction angle of from 10° to 20° to the vicinity of the diffraction angle of from 30° to 40° is defined as a background, and the background is subtracted from each diffraction intensity after the intensity correction. Next, in the corrected X-ray diffraction pattern, the peak having a peak top in the vicinity of the diffraction angle 2θ of 26° is superimposed onto a Gaussian basic waveform to be approximated, to thereby optimize a peak intensity, a peak half width, and a peak position, and each of three superimposed peaks included in the above-mentioned peak is subjected to curve fitting, to thereby perform peak separation. The curve fitting is performed so that a residual sum of squares becomes smallest. The residual square refers to a square of a residual error at each measured diffraction angle, and the residual sum of squares refers to a sum of residual squares. Further, the residual error refers to a difference between the intensity of the peak having a peak top in the vicinity of the diffraction angle 2θ of 26° in the corrected X-ray diffraction pattern and the sum of intensities of the three separated peaks ($f_{broad}$, $f_{middle}$, and $f_{narrow}$).

Through such peak separation, three peaks, that is, the two peaks $f_{broad}$ and $f_{middle}$ of a low-crystalline component and the peak $f_{narrow}$ of a high-crystalline component, are obtained. The peak $f_{broad}$ is observed in the vicinity of a diffraction angle of 24.0°±4.0° and is defined as a peak having a half width of 10°±5.0°. The peak $f_{middle}$ is observed in the vicinity of a diffraction angle of 26.3°±1.5° and is defined as a peak having a half width of 3.5°±3.0°. The peak $f_{narrow}$ is observed in the vicinity of a diffraction angle of 26.5°±1.0° and is defined as a peak having a half width of 1.0°±0.9°.

The above-mentioned three peaks of the catalyst of the present invention may satisfy the following conditions (a) to (c): (a) $f_{broad}$: 75% or more and 95% or less; (b) $f_{middle}$: 3.5% or more and 15% or less; and (c) $f_{narrow}$: 0.4% or more and 12% or less.

Further, the above-mentioned three peaks of the catalyst of the present invention may satisfy the following conditions (a) to (c): (a) $f_{broad}$: 78% or more and 95% or less; (b) $f_{middle}$: 4.0% or more and 15% or less; and (c) $f_{narrow}$: 1.0% or more and 12% or less.

The catalyst of the present invention may have the above-mentioned carbon structure in which a carbon dioxide desorption amount at from 150° to 900° C. exhibits a maximum value within a range of from 200° C. to 340° C. in a temperature programmed desorption method including measuring a desorption amount of carbon dioxide at from 0° C. to 1,000° C.

The temperature programmed desorption (TPD) method involves subjecting the catalyst of the present invention to heat treatment for desorbing a functional group from a carbon structure of the catalyst of the present invention, chemically adsorbing oxygen to the carbon structure, and then measuring a desorption amount of carbon dioxide from the carbon structure within a temperature range of from 0° C. to 1,0000° C.

In such TPD, the temperature at which the desorption amount of carbon dioxide from the catalyst of the present invention at from 1500° C. to 900° C. exhibits a maximum value (hereinafter sometimes referred to as "peak top position") falls within a range of from 200° C. to 340° C. The peak top position of the catalyst of the present invention in the desorption of carbon dioxide of the TPD may fall within, for example, from 200° C. to 320° C.

The catalyst of the present invention may have the above-mentioned carbon structure that exhibits a carbon monoxide desorption amount at from 150° C. to 1,000° C. of 0.3 mmol/g or more and a carbon dioxide desorption amount at from 150° C. to 900° C. of 0.1 mmol/g or more in a temperature programmed desorption method including measuring a desorption amount of carbon monoxide and carbon dioxide at from 0° C. to 1,000° C.

In the same manner as in the above-mentioned case, this TPD method involves subjecting the catalyst of the present invention to heat treatment for desorbing a functional group from a carbon structure of the catalyst of the present invention, chemically adsorbing oxygen to the carbon structure, and then measuring a desorption amount of carbon monoxide and a desorption amount of carbon dioxide from the carbon structure for one gram of the catalyst of the present invention within a temperature range of from 0° C. to 1,000° C.

In such TPD, the carbon monoxide desorption amount at from 150° C. to 1,000° C. of the catalyst of the present invention is 0.30 mmol/g or more, and the carbon dioxide desorption amount at from 150° C. to 900° C. is 0.10 mmol/g or more. Further, the carbon monoxide desorption amount of the catalyst of the present invention may be 0.35 mmol/g or more, and the carbon dioxide desorption amount may be 0.11 mmol/g or more. There is no particular limitation on the upper limit value of those desorption amounts, but for example, the carbon monoxide desorption amount may be 1.0 mmol/g or less, and the carbon dioxide desorption amount may be 0.5 mmol/g or less.

The catalyst of the present invention may have the above-mentioned carbon structure that exhibits an oxygen adsorption heat of 13 kJ/mol or less in oxygen adsorption and desorption measurement.

Here, the measurement of an oxygen adsorption heat will be described in detail. The oxygen adsorption heat is determined by oxygen adsorption and desorption measurement. The oxygen adsorption and desorption measurement refers to oxygen adsorption measurement involving adsorbing oxygen gas to the catalyst of the present invention at a predetermined temperature, to thereby measure an adsorption amount thereof, and oxygen desorption measurement involving desorbing the oxygen gas from the catalyst of the present invention to which the oxygen gas has been adsorbed, to thereby measure a desorption amount thereof. The oxygen adsorption heat is determined based on the results of the oxygen adsorption measurement through use of the Clausius-Clapeyron equation "$(\delta \ln P/\delta T)_a = q_{st}, RT^2$". In the equation, P represents an equilibrium absolute pressure (Torr), T represents a measurement temperature (K), θ represents a coverage obtained by dividing the adsorption amount by the surface area of an adsorbent, R represents a gas constant (=0.00831 kJ/mol·K), and $q_{st}$ represents an adsorption heat (kJ/mol).

More specifically, oxygen adsorption isotherm measurement is performed at temperatures of 268 K, 273 K, and 298

K. Specifically, the oxygen adsorption measurement is performed in which the catalyst of the present invention is subjected to heat treatment in vacuum at 200° C. for 2 hours, then oxygen gas is introduced into the catalyst of the present invention so that an equilibrium is achieved at a designated relative pressure at temperatures of 268 K, 273 K, and 298 K, and the introduction amount of the oxygen gas at a time when the equilibrium is achieved is plotted as an oxygen adsorption amount. Next, when the relative pressure reaches 1, the oxygen desorption measurement is performed in which an oxygen desorption amount from the catalyst of the present invention is plotted. Then, an oxygen adsorption isotherm is determined based on the results of the oxygen adsorption measurement. Here, the oxygen adsorption isotherm refers to a graph showing a change in oxygen adsorption amount with respect to a relative pressure. The horizontal axis thereof represents a relative pressure ($P/P^0$) obtained by dividing the equilibrium absolute pressure by a saturated vapor pressure, and the vertical axis represents an oxygen adsorption amount. Further, a value obtained from the oxygen adsorption isotherm is substituted into a linear expression created through use of the Clausius-Clapeyron equation, and an oxygen adsorption heat is determined based on the slope thereof. The expression "$\ln P = -(q_{st}/R)\cdot(1/T) + C$" (C represents an integration constant) is obtained by integration of the above-mentioned equation, and "ln P" and "1/T" are linear. Therefore, an adsorption heat $q_{st}$ is determined based on the slope of the expression.

The catalyst of the present invention has, for example, oxygen reduction activity as catalyst activity. In this case, the catalyst of the present invention effectively catalyzes an oxygen reduction reaction at an electrode for a fuel cell or an electrode for an air cell.

The oxygen reduction activity is evaluated, for example, based on an oxygen reduction starting potential. Specifically, the oxygen reduction starting potential is determined as a voltage $E_{O2}$ at which a reduction current of $-10$ $\mu A/cm^2$ flows, in data (oxygen reduction voltammogram) representing a relationship between the voltage and the current density obtained by performing sweep application of a potential through use of a rotating ring disk electrode device including a working electrode having the catalyst of the present invention applied thereto.

In this case, the oxygen reduction starting potential $E_{O2}$ exhibited by the catalyst of the present invention may be, for example, from 0.60 V or more versus normal hydrogen electrode (vs. NHE) and 1.2 V or less vs. NHE, preferably 0.80 V or more vs. NHE and 1.2 V or less vs. NHE, particularly preferably 0.82 V or more vs. NHE and 1.2 V or less vs. NHE.

Further, the oxygen reduction activity of the catalyst of the present invention is also evaluated based on, for example, a current density $i_{0.7}$ ($mA/cm^2$) at a time of application of a voltage of 0.7 V (vs. NHE) in the above-mentioned oxygen reduction voltammogram.

In this case, the current density $i_{0.7}$ exhibited by the catalyst of the present invention may be, for example, $-1.0$ ($mA/cm^2$) or less (for example, from $-1.0$ ($mA/cm^2$) to $-5.0$ ($mA/cm^2$)), preferably $-1.1$ ($mA/cm^2$) or less (for example, from $-1.1$ ($mA/cm^2$) to $-4.0$ ($mA/cm^2$)).

The catalyst of the present invention is obtained by carbonizing a raw material containing an organic substance and a transition metal. Specifically, the catalyst of the present invention contains a transition metal. More specifically, the catalyst of the present invention may contain a transition metal internally.

The organic substance contained in the raw material is not particularly limited as long as the organic substance can be carbonized. Specifically, as the organic substance, for example, high-molecular-weight organic compounds (e.g., resins such as a thermosetting resin and/or a thermoplastic resin), and/or low-molecular-weight organic compounds are used. Further, a biomass may be used as the organic substance.

As the organic substance, a nitrogen-containing organic substance is preferably used. The nitrogen-containing organic substance is not particularly limited as long as the nitrogen-containing organic substance is an organic substance containing an organic compound that contains a nitrogen atom in molecules, and any one or more kinds thereof are used. The catalyst of the present invention obtained through use of the raw material containing a nitrogen-containing organic substance contains a nitrogen atom.

Specific examples of the organic compound include one or more kinds selected from the group consisting of a phenol resin, polyfurfryl alcohol, furan, a furan resin, a phenol formaldehyde resin, melamine, a melamine resin, an epoxy resin, a nitrogen-containing chelate resin (e.g., one or more kinds selected from the group consisting of a polyamine type, an iminodiacetic acid type, an aminophosphoric acid type, and an aminomethylphosphonic acid type), a polyamide imide resin, pyrrole, polypyrrole, polyvinylpyrrole, 3-methylpolypyrrole, acrylonitrile, polyacrylonitrile, a polyacrylonitrile-polymethacrylic acid copolymer, polyvinylidene chloride, thiophene, oxazole, thiazole, pyrazole, vinylpyridine, polyvinylpyridine, pyridazine, pyrimidine, piperazine, pyran, morpholine, imidazole, 1-methylimidazole, 2-methylimidazole, quinoxaline, aniline, polyaniline, succinic dihydrazide, adipic dihydrazide, polysulfone, polyaminobismaleimide, polyimide, polyvinyl alcohol, polyvinyl butyral, benzimidazole, polybenzimidazole, polyamide, polyester, polylactic acid, polyether, polyether ether ketone, cellulose, carboxymethyl cellulose, lignin, chitin, chitosan, pitch, brown coal, silk, wool, polyamino acids, nucleic acids, DNA, RNA, hydrazine, hydrazide, urea, salen, polycarbazole, polybismaleimide, triazine, polyacrylic acid, a polyacrylic acid ester, a polymethacrylic acid ester, polymethacrylic acid, polyurethane, polyamideamine, and polycarbodiimide.

The content of the organic substance in the raw material is not particularly limited as long as the content falls within a range in which the catalyst of the present invention is obtained. The content of the organic substance in the raw material may be, for example, from 5 mass % to 90 mass %, preferably from 10 mass % to 80 mass %.

The transition metal contained in the raw material may be a metal belonging to Groups III to XII in the periodic table, and one or more kinds of the transition metals belonging to the fourth period of Groups III to XII in the periodic table are preferably used.

Specific examples of the transition metal may include one or more kinds selected from the group consisting of scandium (Sc), titanium (Ti), vanadium (V), chromium (Cr), manganese (Mn), iron (Fe), cobalt (Co), nickel (Ni), copper (Cu), zinc (Zn), yttrium (Y), zirconium (Zr), niobium (Nb), molybdenum (Mo), ruthenium (Ru), rhodium (Rh), palladium (Pd), lanthanoids (cerium (Ce) and others), and actinoids. Of those, one or more kinds selected from the group consisting of Sc, Ti, V, Cr, Mn, Fe, Co, Ni, Cu, and Zn are preferred.

The raw material may contain a transition metal and a metal other than the transition metal. Specifically, the raw material may contain, for example, one or more kinds of the transition metals and one or more kinds of metals selected from typical metals. Specific examples of the metal other than the transition metal may include one or more kinds of metals selected from the group consisting of alkali metals (e.g., one or more kinds selected from the group consisting of sodium (Na) and potassium (K)), alkaline earth metals (e.g., one or more kinds selected from the group consisting of magnesium (Mg) and calcium (Ca)), metals belonging to Group 13 in the periodic table (e.g., one or more kinds selected from the group consisting of aluminum (Al), gallium (Ga), and indium (In)), and metals belonging to Group 14 in the periodic table (e.g., one or more kinds selected from the group consisting of germanium (Ge), tin (Sn), and lead (Pb)).

As the metal, a simple substance of the metal or a compound of the metal is used. As the metal compound, one or more kinds selected from the group consisting of, for example, a metal salt, a metal oxide, a metal hydroxide, a metal nitride, a metal sulfide, a metal carbide, and a metal complex may be used.

The content of the transition metal in the raw material is not particularly limited as long as the content falls within a range in which the catalyst of the present invention is obtained. The content of the transition metal in the raw material may be, for example, from 1 mass % to 90 mass %, preferably from 2 mass % to 80 mass %.

The raw material may further contain a carbon material. As the carbon material, for example, a conductive carbon material is used. Specifically, for example, one or more kinds selected from the group consisting of carbon black, a carbon nanotube, a carbon nanohorn, a carbon fiber, a carbon fibril, and graphite powder are used.

The raw material is prepared by mixing the organic substance and the transition metal. A method of mixing the raw material is not particularly limited, and for example, a mortar or a stirring device is used.

Carbonization is performed by heating a raw material and keeping the raw material at a temperature at which the raw material is carbonized (hereinafter referred to as "carbonizing temperature") The carbonizing temperature is not particularly limited as long as the raw material is carbonized. The carbonizing temperature may be, for example, 300° C. or more or 700° C. or more. More specifically, the carbonizing temperature may be, for example, from 300° C. to 3,000° C. or from 700° C. to 2,000° C.

The rate of temperature increase up to the carbonizing temperature is, for example, from 0.5° C./min to 300° C./min. The period of time for keeping the raw material at the carbonizing temperature is, for example, from 5 minutes to 24 hours. It is preferred that the carbonization be performed under the circulation of inert gas, such as nitrogen.

The catalyst of the present invention is a carbonized material obtained by the above-mentioned carbonization of a raw material. Specifically, the carbonized material obtained by the above-mentioned carbonization may be used directly as the catalyst of the present invention.

Further, the catalyst of the present invention may be obtained by subjecting the carbonized material obtained by the above-mentioned carbonization to further treatment. Specifically, the catalyst of the present invention may be obtained by, for example, subjecting the carbonized material to metal removal treatment. The metal removal treatment is treatment for removing a metal contained in the carbonized material. The metal removal treatment is not particularly limited as long as the treatment reduces the amount of the metal contained in the carbonized material, and may be, for example, washing treatment using an acid or electrolytic treatment.

There is no particular limitation on an acid to be used for the washing treatment using an acid as long as the effect of the metal removal treatment is obtained. For example, one or more kinds selected from the group consisting of hydrochloric acid (e.g., concentrated hydrochloric acid), nitric acid (e.g., concentrated nitric acid), and sulfuric acid (e.g., concentrated sulfuric acid) are used. There is no particular limitation on a method for the washing treatment using an acid, and for example, a method of soaking and holding the carbonized material in a solution containing an acid is used.

Further, the catalyst of the present invention may be obtained by subjecting the carbonized material to the metal removal treatment, followed by heat treatment. Specifically, in this case, first, the carbonized material is subjected to the above-mentioned metal removal treatment, and then, the carbonized material which has already been subjected to the metal removal treatment is subjected to heat treatment.

The heat treatment after the metal removal treatment is performed by keeping the carbonized material at a predetermined temperature (heat treatment temperature). The heat treatment temperature may be 300° C. or more or 700° C. or more. More specifically, the heat treatment temperature may be, for example, from 300° C. to 3,000° C. or from 700° C. to 2,000° C.

The heat treatment temperature may be equal to or different from the above-mentioned carbonizing temperature. Specifically, the heat treatment temperature may be, for example, lower than the carbonizing temperature.

The rate of temperature increase up to the heat treatment temperature is, for example, from 0.5° C./min to 300° C./min. The period of time for keeping the raw material at the heat treatment temperature is, for example, from 5 minutes to 24 hours. It is preferred that the heat treatment be performed under the circulation of inert gas, such as nitrogen.

An electrode according to one embodiment of the present invention (hereinafter referred to as "electrode of the present invention") includes the catalyst of the present invention. Specifically, the electrode of the present invention is, for example, an electrode carrying the catalyst of the present invention. Specifically, the electrode of the present invention is, for example, an electrode including an electrode base material and the catalyst of the present invention carried on the electrode base material.

The electrode of the present invention is, for example, an electrode for a battery. Specifically, the electrode of the present invention is, for example, an electrode for a fuel cell or an electrode for an air cell. Further, the electrode of the present invention is, for example, a cathode electrode or an anode electrode, preferably a cathode electrode.

A battery according to one embodiment of the present invention (hereinafter referred to as "battery of the present invention") includes the electrode of the present invention. Specifically, the battery of the present invention is, for example, a fuel cell or an air cell including the electrode of the present invention. The battery of the present invention may include, for example, a membrane/electrode assembly including the electrode of the present invention. The battery of the present invention is a battery including the electrode of the present invention as one or both of the cathode electrode and the anode electrode, preferably a battery including the electrode of the present invention as the cathode electrode.

Next, specific Examples according to the embodiments of the present invention will be described.

Example 1

[Production of Carbon Catalyst]

17 kinds of carbon catalysts (Samples 1 to 17) were produced. First, a raw material to be carbonized was prepared. Specifically, 1.0 g of a polyacrylonitrile-polymethacrylic acid copolymer (PAN/PMA) was added to and dissolved in 15 g of dimethylformamide, to thereby prepare a solution (a). Further, 1.0 g of 2-methylimidazole and a first metal were added to and dissolved in 15 g of dimethylformamide, to thereby prepare a solution (b). Next, the solution (a) and the solution (b) were mixed, and a second metal was further added and mixed with the mixture. For Samples 6 to 8 and 11 to 13, the solution (a) and the solution (b) were mixed, and the second metal was further added and mixed with the mixture. Then, 0.9 g of Ketchen black was added and mixed with the resultant. After that, the obtained mixed solution was subjected to vacuum drying at 60° C. for 24 hours.

For Samples 1 to 5, 5.78 g of zinc chloride ($ZnCl_2$) was used as the first metal, and 0.187 g of iron powder was used as the second metal. For Sample 6, 0.9 g of iron(III) chloride hexahydrate ($FeCl_3.6H_2O$) was used as the first metal, and 6.39 g of tin oxide ($SnO_2$) was used as the second metal. For Sample 7, 0.9 g of iron (III) chloride hexahydrate ($FeCl_3.6H_2O$) was used as the first metal, and 3.195 g of tin oxide ($SnO_2$) was used as the second metal. For Sample 8, 0.9 g of iron(III) chloride hexahydrate ($FeCl_3.6H_2O$) was used as the first metal, and 0.639 g of tin oxide ($SnO_2$) was used as the second metal. For Sample 9, 0.578 g of zinc chloride ($ZnCl_2$) was used as the first metal, and 0.187 g of iron powder was used as the second metal. For Sample 10, 2.89 g of zinc chloride ($ZnCl_2$) was used as the first metal, and 0.187 g of iron powder was used as the second metal. For Sample 11, 9.007 g of germanium chloride ($GeCl_4$) was used as the first metal, and 0.187 g of iron powder was used as the second metal. For Sample 12, 4.503 g of germanium chloride ($GeCl_4$) was used as the first metal, and 0.187 g of iron powder was used as the second metal. For Sample 13, 0.901 g of germanium chloride ($GeCl_4$) was used as the first metal, and 0.187 g of iron powder was used as the second metal. For Sample 14, 0.545 g of cobalt chloride ($CoCl_2$) was used as the first metal, and 0.187 g of iron powder was used as the second metal. For Sample 15, 4.16 g of copper (I) chloride (CuCl) was used as the first metal, and 0.187 g of iron powder was used as the second metal. For Sample 16, 2.08 g of copper (I) chloride (CuCl) was used as the first metal, and 0.187 g of iron powder was used as the second metal. For Sample 17, 0.416 g of copper (I) chloride (CuCl) was used as the first metal, and 0.187 g of iron powder was used as the second metal.

Next, the mixture obtained by the above-mentioned vacuum drying was heated in the atmosphere to be made infusible. Specifically, the above-mentioned mixture was heated in the atmosphere so as to be increased in temperature from room temperature to 150° C. over 30 minutes, and then increased in temperature from 150° C. to 220° C. over 2 hours. After that, the mixture was kept at 220° C. for 3 hours to be made infusible. Thus, a carbonized raw material was prepared.

The raw material obtained by the above-mentioned infusibilization was pulverized. Specifically, a silicon nitride ball having a diameter of 10 mm was set in a planetary ball mill (P-7, manufactured by Fritsch Japan Co., Ltd.), and the raw material was pulverized with the planetary ball mill.

Then, the raw material was carbonized. Specifically, the raw material obtained by the above-mentioned drying and infusibilization was placed in a quartz tube. The raw material was heated to 800° C. (Sample 1), 900° C. (Sample 2), 1,000° C. (Samples 3 and 6 to 17), 1,100° C. (Sample 4), or 1,200° C. (Sample 5) in an image furnace in a nitrogen atmosphere, and kept in this state for 1 hour so as to be carbonized.

Further, the carbonized material obtained by the above-mentioned carbonization was pulverized, Specifically, a silicon nitride ball having a diameter of 0 mm was set in a planetary ball mill (P-7, manufactured by Fritsch Japan Co., Ltd.), and the carbonized material was pulverized with the planetary ball mill. Further, zirconia beads having a diameter of 0.3 mm and methanol were loaded into a bead mill (manufactured by Imex Co., Ltd.), and the carbonized material was pulverized with the bead mill.

Further, metal removal treatment was performed by acid washing-Specifically, 20 mL of concentrated hydrochloric acid was added to 1.0 g of the carbonized material obtained by the above-mentioned pulverization, and the resultant was stirred for 30 minutes. The carbonized material was precipitated, and the solution was removed. This treatment was repeated several times, and then, distilled water was added to the resultant, followed by stirring. The solution containing the carbonized material was filtered with a filtration film and washed with distilled water until the filtrate became neutral. The collected carbonized material was subjected to vacuum drying. Further, the dried carbonized material was pulverized with a mortar.

Next, heat treatment was performed. Specifically, the carbonized material which had already been subjected to the metal removal treatment as described above was placed in a quartz tube. The carbonized material was heated to 700° C. in an image furnace in a nitrogen atmosphere and kept in this state for 1 hour to be subjected to heat treatment after the metal removal treatment. Then, the carbonized material subjected to the above-mentioned heat treatment was pulverized. Specifically, the carbonized material was pulverized with the above-mentioned planetary ball mill. Thus, a powdery carbonized catalyst was obtained.

[Evaluation of Oxygen Reduction Activity]

The oxygen reduction activity of the carbon catalyst produced as described above was evaluated. First, 50 μL of a 5 wt % commercially available Nafion (trademark) solution (produced by Sigma-Aldrich) and 500 μL of a solution obtained by mixing distilled water and isopropanol at a volume ratio of 8:2 were added to 5 mg of the carbon catalyst. Then, the resultant was subjected to ultrasonic treatment, to thereby provide a catalyst slurry.

Then, the catalyst slurry was pipetted and applied to a disk electrode (diameter: 5 mm) of a rotating ring disk electrode device (RRDE-1 SC-5, Nikko Keisoku Co., Ltd.), followed by drying, to thereby manufacture a working electrode. A platinum electrode was used as a counter electrode, and a normal hydrogen electrode was used as a reference electrode. A 0.1 M perchloric acid ($HClO_4$) aqueous solution saturated with oxygen was used as an electrolyte solution.

Then, a current density obtained by rotating the electrode at a rotation speed of 1,600 rpm and sweeping a potential at a sweep speed of 0.5 mV/sec was recorded as a function of a potential. From the oxygen reduction voltammogram thus obtained, a voltage (V vs. NHE) (oxygen reduction starting potential $E_{O2}$) at a time when a reduction current of −10

$\mu A/cm^2$ flowed and a current density $i_{0.7}$ ($mA/cm^2$) at a time when a voltage of 0.7 V (vs. NHE) was applied were recorded.

[Powder X-Ray Diffraction]

A sample of the powdery carbon catalyst was placed in a concave portion (2 cm×2 cm×0.5 mm in thickness) of a glass sample plate and pressed with a slide glass so as to be uniformly filled into the concave portion so that the surface of the sample was matched with a reference surface. Then, the glass sample plate was fixed onto a wide-angle X-ray diffraction sample stage so that the filled sample was not deformed.

Then, X-ray diffraction measurement (XRD) was performed through use of an X-ray diffraction device (Rigaku RINT2100/PC, manufactured by Rigaku Corporation). The voltage and current applied to an X-ray tube were 50 kV and 300 mA, respectively. The sampling interval was 0.1°, the scanning speed was 1°/min, and the measurement angle range (2θ) was from 5° to 90°. As an incident X-ray, CuKα was used. The sample thickness was set to 0.5 mm, and the divergence slit width β was set to ⅔°.

When the carbon catalyst has a laminated structure formed of a curved net surface that contributes to the catalyst activity of the carbon catalyst, a diffraction peak of a carbon (002) plane appears in the vicinity of a diffraction angle (2θ) of 26° (range of from 23° to 27°) in an X-ray diffraction pattern. In this peak, three kinds of peaks including one graphite structure peak ($f_{narrow}$) derived from a (002) plane of a graphite structure that is a high-crystalline component and two peaks ($f_{middle}$ and $f_{broad}$) derived from a low-crystalline component are mixed.

Then, through the peak separation of X-ray diffraction data, the peak in the vicinity of 26° was separated into three peaks $f_{broad}$, $f_{middle}$, and $f_{narrow}$. The separation of the peak was performed by superimposing the overlapping peaks onto a Gaussian basic waveform to approximate the overlapping peaks. The diffraction pattern subjected to intensity correction and background correction described later was subjected to fitting by optimizing a peak intensity, a peak half width, and a peak position of a Gauss function, serving as each component, as parameters.

The intensity correction was performed by dividing the diffraction intensity at each diffraction angle by an intensity correction coefficient. The intensity correction coefficient is represented by a product of a polarization factor (P), a Lorentz factor (L), and an atom scattering factor of carbon (fc). The factors are as follows: "polarization factor: $P=2+\cos^2 2\theta$", "Lorentz factor: $L=1/(\sin^2\theta \cdot \cos\theta)$", and "atom scattering factor of carbon: $fc=-117.37\times s^6+411.32\times s^5-535.68\times s^4+304.55\times s^3-55.82\times s^2-11.943\times s+6.0184$ (where $s=(\sin\theta)/1.54183$)". The background correction was performed by defining a straight line connecting the vicinity of the diffraction angle of from 10° to 20° to the vicinity of the diffraction angle of from 30° to 40° as a background, and subtracting the background from each diffraction intensity after the intensity correction. A ratio of each component was calculated based on an area of each peak obtained by the above-mentioned peak separation.

[Temperature Programmed Desorption Method]

The carbon catalyst was installed in a temperature programmed desorption device (manufactured by BEL Japan, Inc.), and subjected to heat treatment under high vacuum to desorb a surface functional group of the carbon catalyst. Then, oxygen was adsorbed to the surface of the carbon catalyst, and a flow of carrier gas (He) was performed at 50 mL/min to heat the carbon catalyst. The desorbed gas was measured with a quadrupole mass spectrometer (QMS).

Specifically, first, pretreatment (desorption of a catalyst surface functional group by heat treatment) of the carbon catalyst was performed. More specifically, 0.02 g of the carbon catalyst was filled into a center portion of a reaction tube made of quartz and set in a temperature programmed desorption device. The temperature of the inside of the device was increased to 50° C. at a temperature increase rate of 5° C./min and kept in this state for 40 minutes, to thereby stabilize the device. After that, the carbon catalyst was heated and the temperature was increased to 1,000° C. at a temperature increase rate of 10° C./min to be subjected to heat treatment, to thereby desorb the functional group on the surface thereof.

Next, oxygen was adsorbed to the surface of the carbon catalyst. Specifically, first, the inside of the device was kept at 150° C. for 10 minutes, to thereby stabilize the device. After that, oxygen ($O_2$) gas was circulated through the carbon catalyst subjected to the heat treatment as described above so as to achieve 5 vol %, and the carbon catalyst was kept in this state at 150° C. for 20 minutes, to thereby chemically adsorb oxygen to the surface (mainly, an edge surface) of the carbon catalyst.

Next, the carbon catalyst was subjected to heat treatment, and the desorbed carbon monoxide (CO) and carbon dioxide ($CO_2$) were measured. Specifically, helium (He) gas was circulated in the device at 15° C. for 25 minutes, to thereby remove oxygen that has not been chemically adsorbed to the carbon catalyst. Next, the temperature of the inside of the device was increased again from 150° C. to 1,000° C. at a temperature increase rate of 10° C./min. During the increase in temperature, helium (He) gas was circulated in the device at 50 mL/min. Carbon monoxide and carbon dioxide generated by the desorption of the oxygenated compound were detected, and a correlation between the temperature (horizontal axis) and the detection intensity (vertical axis) was recorded.

Then, the amounts of the desorbed carbon monoxide and carbon dioxide were determined. Specifically, integral values of detection intensities (detection intensity areas) of carbon monoxide and carbon dioxide from 150° C. at which the heat treatment was started to a temperature (1,000° C. or 900° C.) at which quantification was intended to be performed were respectively calculated.

Meanwhile, a calibration curve representing a correlation between the desorption amounts of carbon monoxide and carbon dioxide and the detection intensity area was obtained through use of a predetermined amount of calcium oxalate monohydrate ($CaC_2O_4 \cdot H_2O$) as a reference material. Specifically, 0.02 g of a sample containing a mixture of alumina and calcium oxalate monohydrate ($CaCl_2O_4 \cdot H_2O$) was subjected to heat treatment under the above-mentioned conditions so that the content of calcium oxalate reached 250 μmol, 500 μmol, 750 μmol, or 1,000 μmol, to thereby obtain a calibration curve. Then, the desorption amounts (release amounts) of carbon monoxide and carbon dioxide from the carbon catalyst were quantified based on the detection intensity area obtained by the measurement and the calibration curve.

Further, the temperature at which the carbon dioxide desorption amount exhibited a maximum value in a TPD curve obtained by measuring the carbon dioxide desorption amount was determined as a peak top position (° C.)

[Measurement of Oxygen Adsorption Heat]

For measuring an oxygen adsorption heat, a commercially available device (BELSORP-max, manufactured by BEL Japan, Inc.) was used. The oxygen adsorption heat was determined by determining an oxygen adsorption isotherm from the oxygen adsorption measurement as described above and substituting a value obtained from the oxygen adsorption isotherm into the Clausius-Clapeyron equation. Specifically, first, oxygen adsorption and desorption measurement was performed at 268 K, 273 K, and 298 K, and an oxygen adsorption isotherm was determined based on the results of the oxygen adsorption measurement. Then, a value obtained from the oxygen adsorption isotherm was substituted into a linear expression created through use of the Clausius-Clapeyron equation, and an oxygen adsorption heat was determined based on the slope thereof.

[Results]

FIG. 1 is a table for showing results obtained by evaluating, for each of 17 kinds of Samples 1 to 17, oxygen reduction activity ($E_{O2}$ (V vs. NHE) and $i_{0.7}$ (mA/cm$^2$)), area ratios (%) of three kinds of peaks ($f_{broad}$, $f_{middle}$, and $f_{narrow}$) in the XRD, a CO desorption amount (mmol/g), a $CO_2$ desorption amount (mmol/g), and a peak top position (° C.) in the TPD, and an oxygen adsorption heat (kJ/mol).

Figure 2B:
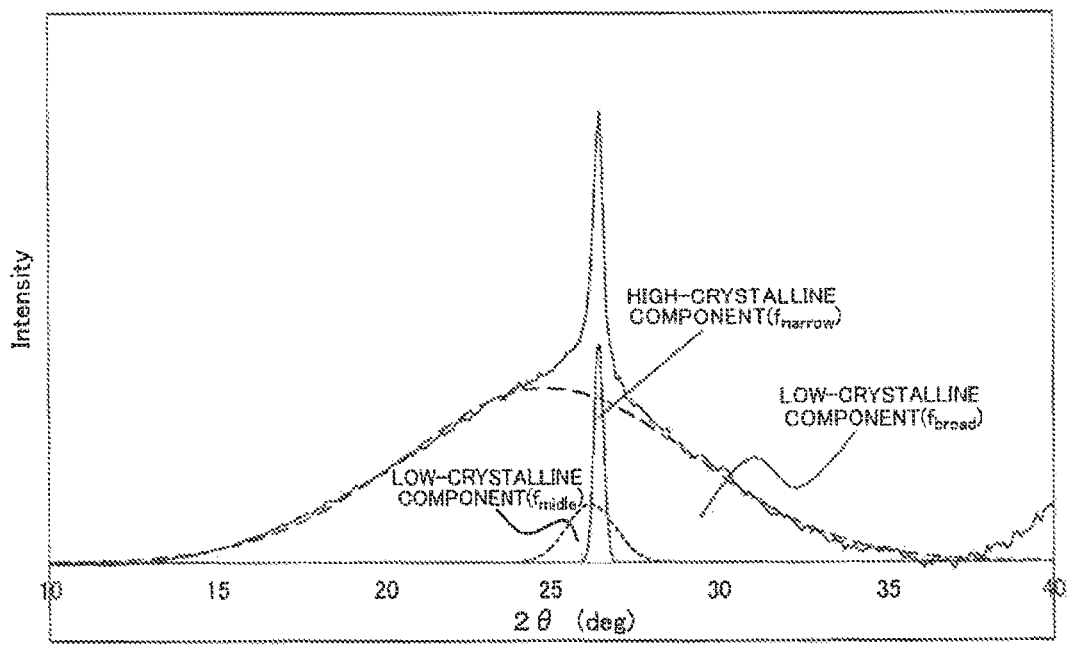
FIG. 2B is an explanatory diagram showing one example of results obtained by performing XRD peak separation in Sample 3 of Example 1 according to one embodiment of the present invention.

FIG. 2A and FIG. 2B are graphs showing results obtained by performing peak separation in the XRD regarding Samples 1 and 3, respectively. As shown in FIG. 2A and FIG. 2B, three peaks $f_{broad}$, $f_{middle}$, and $f_{narrow}$ were obtained by the peak separation.

Figure 3:
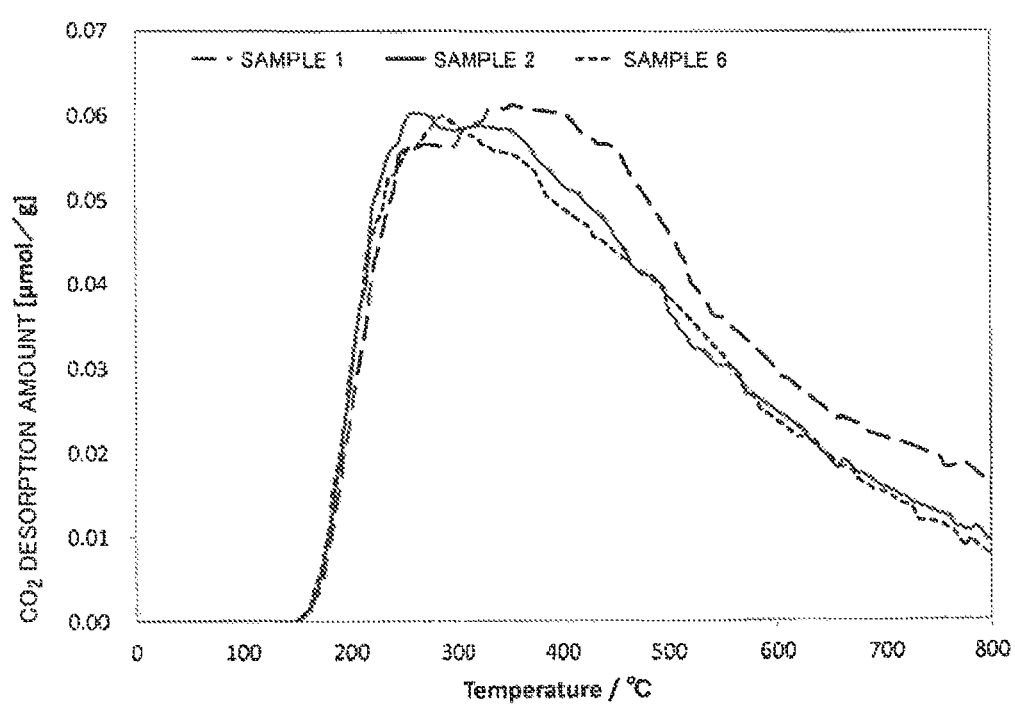
FIG. 3 is an explanatory diagram showing one example of a temperature programmed desorption curve of $CO_2$ desorption obtained in Samples 1, 2, and 6 of Example 1 according to one embodiment of the present invention.

FIG. 3 is a graph for showing a TPD curve obtained by measuring $CO_2$ desorption amounts in Samples 1, 2, and 6. It was determined from FIG. 3 that the peak top position of Sample 1 was at 350° C., and the peak top positions of Samples 2 and 6 fell within a range of from 260° C. to 280° C.

As shown in FIG. 1, the oxygen reduction activity of the carbon catalysts of Samples 2 to 17 was remarkably high compared to that of the carbon catalyst of Sample 1.

In this respect, the area ratios of three kinds of peaks $f_{broad}$, $f_{middle}$, and $f_{narrow}$ of Sample 1 in the XRD were 96.49%, 3.19%, and 0.32%, respectively, whereas the area ratios of three kinds of peaks $f_{broad}$, $f_{middle}$, and $f_{narrow}$ of Samples 2 to 17 in the XRD were from 75.00% to 93.51%, from 4.30% to 14.28%, and from 1.80% to 13.85%, respectively.

Specifically, in the carbon catalysts of Samples 2 to 17 having relatively high oxygen reduction activity, the area ratio of peak $f_{broad}$ fell within a range smaller than that of the carbon catalyst of Sample 1, and the area ratios of peak $f_{middle}$ and peak $f_{narrow}$ fell within a range larger than that of the carbon catalyst of Sample 1.

Thus, it was considered that the carbon structure, for example, in which the area ratios of peaks $f_{broad}$, $f_{middle}$, and $f_{narrow}$ in the XRD were from 75% to 96%, from 3.2% to 15%, and from 0.4% to 15%, respectively, contributed to high oxygen reduction activity of the carbon catalyst.

Further, the peak top position in the TPD curve of $CO_2$ desorption obtained in the TPD was at 350° C. in the carbon catalyst of Sample 1, whereas the peak top position in the TPD curve of $CO_2$ desorption obtained in the TPD fell within a range from 260° C. to 300° C. in the carbon catalysts of Samples 2 to 17.

Thus, it was considered that the carbon structure, for example, in which the desorption amount of $CO_2$ exhibited a maximum value within a range of from 200° C. to 340° C. in the TPD also contributed to high oxygen reduction activity of the carbon catalyst.

In Samples 1 to 17, the CO desorption amount in the TPD was from 0.48 mmol/g to 0.69 mmol/g, and the CO desorption amount in the TPD was from 0.11 mmol/g to 0.15 mmol/g.

Further, the oxygen adsorption heat of Sample 1 was 13.9 kJ/mol, whereas the oxygen adsorption heats of Samples 2 to 17 were from 8.8 kJ/mol to 12.6 kJ/mol. That is, the oxygen adsorption heats of Samples 2 to 17 were smaller than that of Sample 1.

Thus, it was considered that, for example, the carbon structure exhibiting an oxygen adsorption heat of 13 kJ/mol or less in oxygen adsorption and desorption measurement also contributed to high oxygen reduction activity of the carbon catalyst.

Example 2

In Example 2, the power generation performance of a magnesium air cell including an electrode containing the carbon catalyst produced as Sample 4 in Example 1 was evaluated. Specifically, first, the carbon catalyst was applied together with a binder to a glass diffusion layer base material (GDL) having dimensions of 2.5 cm×2.5 cm so that the carried amount of the carbon catalyst of Sample 4 reached 4 mg/cm$^2$, to thereby manufacture a positive electrode. Then, a gasket, the positive electrode, filter paper, and a magnesium plate (negative electrode) were stacked on a cell in the stated order, to assemble a magnesium air cell. Then, the power generation performance of the magnesium air cell was measured by adding a 10% NaCl aqueous solution to the magnesium air cell.

Further, a magnesium air cell was manufactured as Comparative Example 2-1 in the same manner as in Example 2 except that a commercially available Pt/C catalyst (Pt catalyst carried on carbon) was carried at 0.3 mg/cm$^2$ on the positive electrode instead of the carbon catalyst of Sample 4, and the power generation performance thereof was measured.

Further, a magnesium air cell was manufactured as Comparative Example 2-2 in the same manner as in Example 2 except that commercially available carbon black was carried on the positive electrode instead of the carbon catalyst of Sample 4, and the power generation performance thereof was measured.

Figure 4:
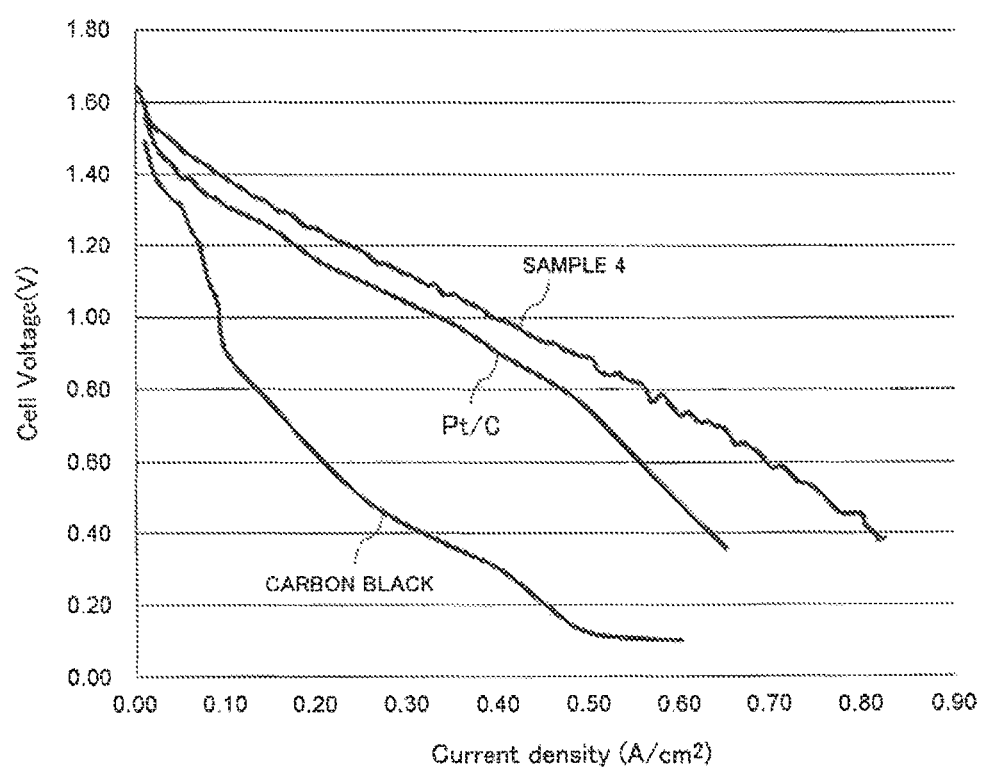
FIG. 4 is an explanatory diagram showing one example of results obtained by evaluating the characteristics of a carbon catalyst in Example 2 according to one embodiment of the present invention.

FIG. 4 is a graph showing the results of a power generation test. It was confirmed that the carbon catalyst of Sample 4 had performance higher than those of Comparative Examples 2-1 and 2-2.

The invention claimed is:

1. A carbon catalyst, comprising a carbon structure in which a carbon dioxide desorption amount at from 150° C. to 900° C. exhibits a maximum value within a range of from 200° C. to 340° C. in a temperature programmed desorption method including measuring a desorption amount of carbon dioxide at from 0° C. to 1,000° C. under helium gas flow.

2. The carbon catalyst according to claim 1, wherein the carbon catalyst comprises the carbon structure that exhibits an oxygen adsorption heat of 13 kJ/mol or less in oxygen adsorption and desorption measurement.

3. An electrode, comprising the carbon catalyst of claim 1.

4. A battery, comprising the electrode of claim 3.

5. The carbon catalyst according to claim 1, wherein the carbon catalyst comprises the carbon structure that exhibits a carbon monoxide desorption amount at from 150° C. to 1,000° C. of 0.30 mmol/g or more and a carbon dioxide desorption amount at from 150° C. to 900° C. of 0.10 mmol/g or more in a temperature programmed desorption method including measuring desorption amounts of carbon monoxide and carbon dioxide at from 0° C. to 1,000° C.

6. The carbon catalyst according to claim 5, wherein the carbon catalyst comprises the carbon structure that exhibits an oxygen adsorption heat of 13 kJ/mol or less in oxygen adsorption and desorption measurement.

7. An electrode, comprising the carbon catalyst of claim 5.

8. A battery, comprising the electrode of claim 7.

* * * * *